United States Patent Office 3,376,222
Patented Apr. 2, 1968

3,376,222
PROCESS FOR PREPARING LUBRICATING GREASE
Richard L. McMillen, Painesville, Ohio, assignor to The Lubrizol Corporation, Wickliffe, Ohio, a corporation of Ohio
No Drawing. Continuation-in-part of applications Ser. No. 323,135, Nov. 12, 1963, and Ser. No. 558,287, June 17, 1966. This application Sept. 20, 1966, Ser. No. 580,575
14 Claims. (Cl. 252—33)

This application is a continuation-in-part of application Ser. No. 558,287, filed June 17, 1966, and Ser. No. 323,135, now abandoned, filed Nov. 12, 1963, each of which is a continuation-in-part of forfeited application Ser. No. 309,293, filed Sept. 16, 1963.

This invention relates to a process for preparing a calcium sulfonate complex which contains a stoichiometrically large amount of calcium. In a more particular sense it relates to a substantially neutral, carbonated calcium sulfonate complex having a metal ratio of at least about 10 and to a gel formed by heating said complex with water. Such gel is useful for the preparation of high film strength lubricating greases.

It is known in the sulfonate art as exemplified by Mertes U.S. Patent 2,501,731; Asseff et al. U.S. Patent 2,723,235; and McMillen et al. U.S. Patent 3,027,325; that a normal calcium sulfonate or sulfonic acid can be complexed with substantially more calcuim than is equivalent to the sulfonic acid anion. The techniques employed by these patentees involve heating and carbonating a mixture of a sulfonic acid or a calcium sulfonate, a slight stoichiometric excess of a calcium base such as calcium oxide or calcium hydroxide, and a promoting agent such as water-alcohol mixtures, phenols, nitro-alkanes, and other active hydrogen compounds. While the exact composition of the products of these patentees is not known, some researchers believe, on the basis of the Tyndall effect, that the excess calcium is due to a dispersion or colloidal suspension of calcium carbonate and/or calcium bicarbonate in the normal sulfonate. In any event, such compositions are known to possess a high calcium content which in many instances cannot be explained by known basic salt structures. Such known methods are effective to produce carbonated calcium sulfonate complexes having metal ratios from about 1.1 to a maximum of about 8.0. The term "metal ratio" as used herein is the ratio of the total equivalents of calcium in the sulfonate complex to the equivalents of sulfonic acid anion therein. It is, thus, a measure of the stoichiometric excess of calcium in a calcium sulfonate complex. For example, a normal sulfonate has a metal ratio of 1.0 and a calcium sulfonate complex which contains twice as much calcium as the normal sulfonate has a metal ratio of 2.0.

It has now been discovered that known carbonated calcium sulfonate complexes having metal ratios from about 1.1 to about 8.0 may be converted by means of a convenient and inexpensive process to substantially neutral, carbonated calcium sulfonate complexes having unusually high metal ratios, i.e., from about 10 to about 20 or more. It has also been discovered that these novel complexes can be converted to gels which are useful for the preparation of high film strength lubricating greases. For the purpose of the present specification and appended claims, a sulfonate complex having a strong base number or acid number less than about 20 as determined by ASTM procedure D974–55T is indicated as being substantially neutral.

It is an object, therefore, of this invention to provide a process for the preparation of oil-soluble, substantially neutral, carbonated calcium sulfontate complexes characterized by metal ratios of at least about 10.

Another object is to provide oil-soluble, substantially neutral, carbonated calcium sulfonate complexes which contain substantially more metal than known calcium sulfonate complexes.

Another object is to provide lubricants containing the aforesaid complexes.

Yet another object is to provide gels which are useful for the preparation of high film strength lubricating greases.

These and other objects are achieved in accordance with the present invention by means of a process which comprises preparing and mixing a mass in which, at 50° C., at least 50 percent of the components are in the liquid state, and in which mass the active components consist of:

(A) A carbonated calcium sulfonate complex having a metal ratio of from about 1.1 to about 8.0;
(B) An oil-soluble calcium phenate;
the ratio of equivalents of A:B being in the range from about 20:1 to about 2:1;
(C) An aliphatic monohydric alcohol, in an amount of at least 5 percent by weight of A;
(D) A calcium base, in an amount such that there is present in the mass a total of at least about 10 equivalents of calcium per equivalent of A;

and then treating the mass with carbon dioxide until the base number thereof is less than about 20 and heating it to drive off substantially all the alcohol and any water present.

The substantially neutral, carbonated calcium sulfonate complexes of this invention find their principal utility as improving agents for liquid lubricants and as starting materials for the preparation of bodied lubricants or greases. Due to their high alkaline reserve, they are particularly effective in neutralizing acidic materials which are found in internal combustion engine crankcase oils as a result of oxidative decomposition of the oil and/or contamination thereof with acidic blow-by products from the combustion chamber.

For the preparation of a gel useful in the manufacture of bodied lubricants or greases, a complex of this invention is heated with water at a temperature of at least about 40° C. and preferably 50°–100° C. until the complex has gelled. Temperatures higher than 100° C., e.g., 150° or 250° C., can also be employed by the application of superatmospheric pressures. Generally the amount of water required for gelation of the complex will be within the range from about 2 to about 40 and more often from about 5 to about 20 weight percent, based on the amount of the complex. Optionally, an alkanol containing from about 1 to about 12 carbon atoms such as methanol, ethanol, isopropanol, isobutanol, mixed primary amyl alcohols, 4-methyl-pentanol-2, n-hexanol, Oxo-octyl alcohol, 3,5,5-trimethyl-n-hexanol-1, Oxo-decyl alcohol, isododecanol, etc., may be used in conjunction with water to shorten the time required for the gelation of the complex. If employed, the alkanol will be used in an amount within the ranges specified above for water. A mixture of methanol and mixed primary alcohols (the latter containing about 65% of n-amyl 3% of isoamyl and 32% of 2-methyl-1-butyl alcohols) is particularly effective in facilitating the gelation of the complex. The time required for gelation will vary widely depending on the particular complex, the amount of water, the optional use of an alkanol, and the temperature of the gelation mass. Thus, in some instances as little as five or ten minutes will suffice, whereas in others five hours or more are necessary. After the gelation of the complex is complete, water and, optionally, any alcohol present are generally removed by heating the gel under atmospheric or subatmospheric pressure until distillation has substantially ceased. For some applications, however, the water and, optionally, alcohol may be allowed to remain in the gel.

Although the gel of the present invention finds its principal utility in the preparation of lubricating greases, it is also useful for the compounding of corrosion-inhibiting compositions, sealing compounds, slushing compositions, and metal drawing compositions.

COMPONENT A

As indicated previously, this component is a carbonated calcium sulfonate complex having a metal ratio of from about 1.1 to about 8.0. These complexes may be prepared from oil-soluble calcium sulfonates or sulfonic acids by known methods such as those set forth, for example, in the above-noted patents to Mertes, Asseff et al., and McMillen et al. In the interest of not unduly lengthening the present specification, it is intended that the disclosures of these patentees be considered as forming a part of this application.

The oil-soluble calcium sulfonate and/or sulfonic acids useful as starting materials for the preparation of component A can be of the cyclic or aliphatic type. The cyclic compounds include the mono- or poly-nuclear aromatic or cycloaliphatic compounds. The oil-soluble sulfonates can be represented for the most part by the following formulas:

(I) $\quad [R_x-T-(SO_3)_y]_z M_b$ (II) $\quad [R'-(SO_3)_a]_d M_b$

In the above formulas, M is either calcium or hydrogen; T is a cyclic nucleus such as, for example, benzene, naphthalene, anthracene, phenanthrene, diphenylene oxide, thianthrene, phenothioxine, diphenylene sulfide, phenothiazine, diphenyl oxide, diphenyl sulfide, diphenylamine, cyclohexane, petroleum naphthenes, decahydronaphthalene, cyclopentane, etc.; R is an aliphatic group such as alkyl, alkenyl, alkoxy, alkoxyalkyl, carboalkoxyalkyl, etc.; $x$ is at least 1, and $R_x-T$ contains a total of at least about 15 carbon atoms. R' in Formula II is an aliphatic radical containing at least about 15 carbon atoms and M is likewise either calcium or hydrogen. Examples of types of the R' radical are alkyl, alkenyl, alkoxyalkyl, carboalkoxyalkyl, etc. Specific examples of R' are petrolatum, saturated and unsaturated paraffin wax, and polyolefins, including polymerized $C_2$, $C_3$, $C_4$, $C_5$, $C_6$, etc., olefins containing from about 15 to 7000 or more carbon atoms. The groups T, R, and R' in the above formulas can also contain other inorganic or organic substituents in addition to those enumerated above such as, for example, hydroxy, mercapto, halogen, nitro, amino, nitroso, sulfide, disulfide, etc. In Formula I, $x$, $y$, and $z$ and $b$ are at least 1, and likewise in Formula II, $a$, $b$, and $d$ are at least 1.

The following are specific examples of oil-soluble sulfonic acids coming within the scope of Formulas I and II above, and it is to be understood that such examples serve also to illustrate the calcium salts of such sulfonic acids. In other words, for every sulfonic acid enumerated it is intended that the corresponding calcium salt thereof is also illustrated. Such sulfonic acids are mahogany sulfonic acids; bright stock sulfonic acids; sulfonic acids derived from lubricating oil fractions having a Saybolt viscosity from about 100 seconds at 100° F. to about 200 seconds at 210° F.; petrolatum sulfonic acids; mono- and poly-wax substituted sulfonic and polysulfonic acids of, e.g., naphthalene, phenol, diphenyl ether, naphthalene disulfide, diphenylamine, thiophene, alpha-chloro naphthalene, etc.; other substituted sulfonic acids such as cetyl chlorobenzene sulfonic acids, cetylphenol monosulfide sulfonic acids, cetoxy caprylbenzene sulfonic acids, dicetyl thianthrene disulfonic acids, dilauryl beta-naphthyl sulfonic acids, dicapryl nitronaphthalene sulfonic acids, and alkaryl sulfonic acids such as dodecyl benzene "bottoms" sulfonic acids (i.e., those acids derived from benzene which has been alkylated with propylene tetramers or isobutene trimers to introduce 1, 2, 3, or more branched-chain $C_{12}$ substituents on the benzene ring. Dodecyl benzene bottoms, principally mixtures of mono- and didodecyl benzenes, are available as by products from the manufacture of household detergents) and mono- and poly-tridecyl benzenes; aliphatic sulfonic acids such as paraffin wax sulfonic acid, unsaturated paraffin wax sulfonic acids, hydroxy-substituted paraffin wax sulfonic acids, hexapropylene sulfonic acids, tetraamylene sulfonic acids, polyisobutene sulfonic acids wherein the polyisobutene contains from 20 to 7000 or more carbon atoms, chloro-substituted paraffin wax sulfonic acids, nitro-paraffin wax sulfonic acids, etc.; cycloaliphatic sulfonic acids such as petroleum naphthene sulfonic acids, cetyl cyclopentyl sulfonic acids, lauryl cyclohexyl sulfonic acids, bis-(diisobutyl) cyclohexyl sulfonic acids, mono- or polywax substituted cyclohexyl sulfonic acids, etc. Additional examples of oil soluble sulfonic acids and/or calcium salts thereof which can be used as starting materials for the preparation of component A are disclosed in the following U.S. Patents: 2,174,110, 2,174,506, 2,174,508, 2,193,824; 2,197,800, 2,202,791, 2,212,786, 2,213,360; 2,228,598, 2,233,676, 2,239,974, 2,263,312, 2,276,090, 2,276,097, 2,315,514, 2,319,121, 2,321,022, 2,333,568, 2,333,788, 2,335,259, 2,337,552, 2,346,568, 2,366,027, 2,374,193, and 2,383,319. With respect to the sulfonic acids or calcium salts thereof, it is intended herein to employ the term "petroleum sulfonic acids" or "calcium petroleum sulfonates" to cover all sulfonic acids or the calcium salts thereof derived from petroleum products. A particularly valuable group of petroleum sulfonic acids are the mahogany sulfonic acids (so called because of their reddish-brown color) obtained as a byproduct from the manufacture of petroleum white oils by a sulfuric acid process. It is to be understood that the sulfonic acids and calcium salts thereof enumerated above are not all equivalent for the purposes of the present invention because, under certain conditions, some are more effective than others.

The following examples are presented to illustrate specific carbonated calcium sulfonate complexes useful as component A herein. In summary, the preparation of such complexes involves carbonating a mixture of calcium sulfonate and/or sulfonic acids, calcium base, and a promoting agent such as water, alcohol-water mixtures, phenols, nitroalkanes, or other active hydrogen compounds at 50–250° C. for 0.5–10 hours and then isolating the oil-soluble carbonated calcium sulfonate complex by suitable means, generally filtration or centrifugation. In most cases, it is preferred to carbonate the reaction mass before filtration or centrifugation, since higher metal ratios are obtained when the carbonation is conducted in this manner. Unless otherwise specified, all parts and percentages are by weight. The neutralization numbers, as indicated earlier, are determined according to ASTM procedure D974–55T. Mineral oil, when used, is a neutral oil having a viscosity of 100–110 Saybolt seconds at 100° F.

Example 1

A normal calcium mahogany sulfonate is prepared by metathesis of a 60% oil solution of sodium mahogany sulfonate (750 parts) with a solution of 67 parts of calcium chloride in 63 parts of water. The reaction mass is heated for 4 hours at 90–100° C. to effect the conversion of the sodium mahogany sulfonate to calcium mahogany sulfonate. 54 parts of lime are then added and the whole is heated to 150° C. over a period of 5 hours. When the whole has cooled to 40° C., 98 parts of methanol are added and 15.2 parts of carbon dioxide are introduced over a period of 20 hours at 42–43° C. Water and alcohol are then removed by heating the mass to 150° C. The residue in the reaction vessel is diluted with 100 parts of low viscosity mineral oil and filtered for purposes of purification. The purified oil solution of the desired carbonated calcium sulfonate complex shows the following analyses:

Percent sulfate ash _____ 16.4
Neutralization No. _____(acidic)__ 0.6
Metal ratio _____ 2.50

Example 2

880 grams (0.968 mole) of a 57.5% oil solution of the calcium sulfonate of tridecylbenzene bottoms (the bottoms constitute a mixture of mono- and di-tridecyl benzenes), 149 grams of methanol, and 59 grams (1.58 equivalents) of calcium hydroxide are introduced into a reaction vessel and stirred vigorously. The whole is heated to 40–45° C. and carbon dioxide is introduced for 0.5 hour at the rate of 2 cubic feet per hour. The carbonated reaction mixture is then heated to 150° C. to remove alcohol and any water present, and the residue is filtered for purposes of purification. The product, a 61% oil solution of the desired carbonated calcium sulfonate complex, shows the following analyses:

Percent sulfate ash _____ 16.84
Neutralization No. _____(acidic)__ 7.0
Metal ratio _____ 2.42

Example 3

A mixture of 1045 grams (1.0 equivalent) of a 45% oil solution of calcium mahogany sulfonate containing 1% of water, 254 grams (7.0 equivalents) of calcium hydroxide, and 251 grams of methanol is prepared, heated to 40% C., and then treated with carbon dioxide at 40–45° C. for 9 hours. The whole is then heated to 150° C., diluted with 790 grams of mineral oil, and filtered for purposes of purification. The filtrate, the desired carbonated calcium mahogany sulfonate complex, shows the following analyses:

Percent sulfate ash _____ 22.2
Neutralization No. _____(acidic)__ 0.4
Metal ratio _____ 7.1

Example 4

A mixture of 1045 grams (1.0 equivalent) of a 45% oil solution of mixed calcium mahogany sulfonate and calcium polydodecyl benzene sulfonate containing 1% of water, 259 grams (7.0 equivalents) of calcium hydroxide, 126 grams of methanol, and 790 grams of mineral oil is heated at the reflux temperature for 1 hour and then treated with carbon dioxide for 4.2 hours at 40–45° C. The mixture is then heated to 150° C. to remove alcohol and any water present. The residue is filtered to yield the desired carbonated calcium sulfonate complex, which shows the following analyses:

Percent sulfate ash _____ 21.3
Neutralization No. _____(acidic)__ 1.2
Metal ratio _____ 6.9

Example 5

A mixture of 2090 grams (2.0 equivalents) of a 45% oil solution of calcium mahogany sulfonate containing 1% of water, 370 grams (10.0 equivalents) of calcium hydroxide, and 251 grams of methanol is heated at the reflux temperature for 1 hour. It is then cooled to 40° C., whereupon carbon dioxide is bubbled through the whole for 14 hours. The carbonated mixture is then heated to 150° C., held at this temperature for 1 hour, and then filtered. The filtrate, the desired carbonated calcium sulfonate complex, shows the following analyses:

Percent sulfate ash _____ 30.0
Neutralization No. _____(acidic)__ 0.9
Metal ratio _____ 5.7

Example 6

A mixture of 74 grams (2.0 equivalents) of calcium hydroxide, 167 grams of water, and 251 grams of isopropanol is heated at the reflux temperature for 1 hour and then treated with 2090 grams of a 45% oil solution of calcium mahogany sulfonate. Carbon dioxide is then bubbled through the mixture at 40–45° C. for 2.2 hours. The isopropanol and water are removed by heating the mixture to 150° C., after which the residue is filtered for purposes of purification. The filtrate, the desired carbonated calcium sulfonate complex, shows the following analyses:

Percent sulfate ash _____ 12.1
Neutralization No. _____(basic)__ 2.8
Metal ratio _____ 2.0

Example 7

A mixture of 2090 grams (2.0 equivalents) of a 45% oil solution of calcium mahogany sulfonate containing 1% of water, 74 grams (2.0 equivalents) of calcium hydroxide, and 251 grams of ethylene glycol is heated for 1 hour at 100° C. Carbon dioxide is then bubbled through this mixture at 40–45° C. for 5.5 hours. The ethylene glycol and any water present are removed by heating the mixture to a temperature of 185° C. at 10.2 mm. Hg. The residue is filtered to yield the desired carbonated calcium sulfonate complex, which shows the following analyses:

Percent sulfate ash _____ 12.9
Neutralization No. _____(acidic)__ 5.0
Metal ratio _____ 2.0

Example 8

A slurry of 74 grams (2.0 equivalents) of calcium hydroxide in 251 grams of ethanol is heated at the reflux temperature for 1 hour. To this there are added 2090 grams (2.0 equivalents) of a 45% oil solution or calcium mahogany sulfonate containing 1% of water. This mixture is treated with carbon dioxide for 4.5 hours at 40–45° C. The resulting product is heated to 150° C., then filtered to yield the purified product. The filtrate, the desired carbonated calcium sulfonate, shows the following analyses:

Percent sulfate ash _____ 11.4
Neutralization No. _____(basic)__ 0.7
Metal ratio _____ 1.8

Example 9

A solution of 185 grams (5.0 equivalents) of calcium hydroxide in 251 grams of isopropyl alcohol and 167 grams of water is heated under reflux for 1 hour. To this solution there is added 2090 grams (2.0 equivalents) of a 45% oil solution of calcium mahogany sulfonate. The temperature is adjusted to 40–45° C. and carbon dioxide is bubbled through the mass for 1.8 hours, at which point the neutralization number is 12.4 (basic). The mixture is then heated to 150° C. and treated for an additional hour at this temperture with carbon dioxide. The whole is diluted with benzene, filtered, and the filtrate concentrated by heating to 150° C./30 mm. Hg. The residue, the desired carbonated calcium sulfonate complex, shows the following analyses:

Percent sulfate ash _____ 12.3
Neutralization No. _____(acidic)__ 0.7
Metal ratio _____ 2.0

Example 10

A mixture of 459 grams of phenol, 244 grams of water, and 90.5 grams of calcium hydroxide is stirred at the reflux temperature for 2 hours. Thereafter 1046 grams of a 45% oil solution of calcium mahogany sulfonate is added. The mass is then heated to 125° C., at which temperature a distillate consisting of 244 grams of water and 32 grams of phenol is obtained. Thereafter the dehydrated mixture is blown with carbon dioxide for 3 hours at 120–150° C. and an additional 60 grams of distillate is collected, which upon analysis is found to contain 42 grams of phenol. Upon heating the mass further to 200° C./20 mm. Hg, 375 grams more of phenol is recovered. The residue in the flask is then filtered to yield the desired carbonated calcium sulfonate complex, which shows the following analyses:

Percent sulfate ash _____ 18.35
Neutralization No. _____(basic)__ 8.07
Metal ratio _____ 3.07

Example 11

1120 grams of a 45% oil solution of calcium mahogany sulfonate, 59 grams of 1-nitropropane, 150 grams of calcium hydroxide, and 830 grams of water are mixed and heated to 100° C. and held there for 1 hour. The temperature is then raised to 150° C. and held at that level for 1 hour. The product is filtered and then blown with carbon dioxide for 2 hours at 150° C. The carbonated filtrate, the desired carbonated calcium sulfonate complex, shows the following analyses:

Percent sulfate ash _____ 13.15
Neutralization No. _____(basic)__ 2.0
Metal ratio _____ 2.36

COMPONENT B

This component is an oil-soluble calcium phenate. Principally useful as such are the calcium phenates of alkylphenols and alkylphenol-aldehyde condensation products, in which phenates the alkyl substituent or substituents contain a total of at least about 6 carbon atoms to impart oil solubility. The terms "phenol" or "phenols" as used herein are intended to include both mono- and polyhydric mono- or poly-nuclear phenols. Likewise, the term "alkyl" is intended to embrace both open chain and cyclic alkyl groups. In most instances, the alkylphenol which is converted directly to the calcium phenate or condensed with an aldehyde and converted to the calcium phenate will be a monoalkyl mono-nuclear phenol in which the alkyl substituent contains from about 3 to about 150 and preferably from about 4 to about 50 carbon atoms. Generally such monoalkyl mononuclear phenol will be devoid of substituents other than the characterizing hydroxyl group and alkyl group or groups, although for some purposes substituent groups such as chloro, bromo, nitro, sulfide, disulfide, ether, amino, nitroso, etc., may be present in the alkyl substituent and/or the aromatic nucleus. Thus, for some purposes it is desirable, for example, to employ a calcium phenate of an alkylphenol which has been converted to the corresponding monosulfide or disulfide. Specific examples of alkylphenols useful for the purposes of this invention include the following (for each alkylphenol given, it is intended to illustrate the corresponding calcium phenate): ortho, para-diethylphenol; n-propylphenol, para-isopropylphenol, diisopropylphenol, n-butylphenol, para-tertiary butylphenol, n-amylphenol, para-tertiary amylphenol, para-cyclopentylphenol, cyclohexylphenol, methylcyclohexylphenol, secondary-hexylphenol, heptylphenol, tertiary-octylphenol, 3,5,5-trimethyl-n-hexylphenol, n-decylphenol, cetylphenol, oleylphenol, wax-alkylated phenol, polyisobutene-substituted phenol in which the polyisobutene substituent contains from about 20 to about 150 or more carbon atoms, etc.; alkylated aryl substituted phenols such as heptyl phenylphenol, isooctyl diphenylphenol, and ditertiary-amyl naphthylphenol; alkylated polyhydroxy aromatic compounds such as heptylalizarin, n-octylquinizarin, isododecylhydroquinone, octylcatechol, heptyl pyrogallol, etc.; alkylated monohydroxy naphthalenes such as dihexyl substituted alpha-naphthol and beta-naphthol; alkylated polyhydroxy naphthalene such as heptyl substituted naphthohydroquinone and naphthoresorcinol; and substituted phenols such as heptyl para-nitrophenol, isododecyl picric acid, para-n-octyl ortho-chlorophenol, tertiary-butyl chlorophenol, ortho-heptyl para-aminophenol, octylphenol monosulfide, heptylphenol disulfide, 2:1 molar condensation product of heptylphenol and formaldehyde, 1:1 molar condensation of tertiary-octylphenol and formaldehyde, 2:1 condensation product of tertiary-amylphenol and acetaldehyde, etc.

The preparation of calcium phenates of alkylphenols, alkylphenol sulfides, and alkylphenol-aldehyde condensation products is well known as shown, e.g., by U.S. Patents Nos. 2,197,833; 2,228,654; 2,228,661; 2,362,289; 2,250,188; 2,280,419; 2,331,448; and 2,252,663. In general, such phenate preparation involves contacting the selected phenolic material with a slight stoichiometric excess of a calcium base such as calcium oxide or hydroxide, calcium methoxide or ethoxide, or calcium carbide at a temperature within the range from about 50° to about 200° C. for 0.25–10 hours. Solvents such as mineral oil, benzene, toluene, and alcohols may be employed to facilitate the reaction, if desired. In some instances, the calcium phenate may be prepared by metathesis of the sodium phenate with a calcium salt such as calcium chloride, calcium nitrate, etc.

Especially useful as component B herein are the calcium phenates of alkylphenol-aldehyde condensation products such as the calcium phenates of the condensation product of formaldehyde with monoalkyl mononuclear phenol in which the alkyl substituent contains from about 3 to about 150 and more often from about 4 to about 50 carbon atoms. In lieu of formaldehyde, other lower aldehydes containing from 2 to about 10 carbon atoms such as acetaldehyde, propionaldehyde, butyraldehyde, valeraldehyde, 2-methyl-butanal-4, furfural, benzaldehyde, etc., may be employed, although formaldehyde is preferred by reason of its low cost, availability, and reactivity. The calcium phenates of alkylphenol-aldehyde condensation products may be prepared by any one of several known methods such as, e.g., (a) condensation of the alkylphenol and aldehyde in a mole ratio from about 4:1 to about 1:4 for 0.5–15 hours at 50–200° C. in the presence of a small amount, generally 0.5–5 percent, of a basic or acidic catalyst such as aqueous ammonia or hydrochloric acid, followed by conversion of the resulting condensation product to the calcium phenate, (b) preparing and heating for 0.5–15 hours at 50–200° C. a mixture of a calcium base such as calcium oxide or hydroxide with an alkylphenol and an aldehyde, in which method the calcium base acts as a catalyst for the condensation reaction and supplies the calcium required for the phenate formation, or (c) heating a mixture of an alkylphenol and a calcium base for 0.5–15 hours at 50–200° C. to prepare the calcium phenate and then condensing the latter intermediate with an aldehyde for an additional 0.5–5 hours at 50–200° C.

The following examples are presented to illustrate specific oil-soluble calcium phenates useful as component B herein. The low viscosity mineral oil, where used, is a neutral oil having a viscosity of 100–110 Saybolt seconds at 100° F.

Example 12

2250 parts of mineral oil, 960 parts (5 moles) of heptylphenol, and 50 parts of water are introduced into a reaction vessel and stirred at 25° C. The mixture is heated to 40° C. and 7 parts of calcium hydroxide and 231 parts (7 moles) of 91 percent assay paraformaldehyde are added over a period of 1 hour. The whole is heated to 80° C. and 200 additional parts of calcium hydroxide (making a total of 207 parts or 5 moles) are added over a period of 1 hour at 80–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered for purposes of purification. The filtrate, a 33.6 percent oil solution of the desired calcium phenate of heptylphenolformaldehyde condensation product, is found to contain 7.56 percent sulfate ash.

Example 13

1308 grams (3 equivalents) of polyisobutene-substituted phenol in which the polyisobutene substituent contains an average of 22 carbon atoms, 608 grams of mineral oil, 30 grams of water, and 122 grams (3.3 equivalents) of calcium hydroxide are introduced into a reaction vessel and stirred for 0.5 hour at 20° C. 135 grams (4.5 equivalents) of paraformaldehyde is then added and a slight temperature rise is noted due to an exothermic reaction. The whole is then stirred for 1 hour at 100° C. and heated to 150–160° C. to remove added water and water of reaction. The reaction mass is then filtered for purposes of purification. The filtrate, a 70 percent oil solution of the desired calcium phenate of polyisobutene-substituted phenol-formaldehyde condensation product, is found to contain 7.75 percent sulfate ash.

Example 14

915 grams (3 equivalents) of $C_{15}$ alkyl substituted phenol, 1000 grams of mineral oil, 30 grams of water, and 122 grams (3.3 equivalents) of calcium hydroxide are introduced into a reaction vessel and stirred. An exothermic reaction causes the temperature to rise to 35° C. The whole is then heated for 1.5 hours at 98° C. and dried by heating to 150–160° C. The crude product is filtered for purposes of purification. The filtrate, a 51 percent oil solution of the desired calcium phenate of $C_{15}$ alkyl substituted phenol-formaldehyde condensation product, is found to contain 8.64 percent sulfate ash.

Example 15

20 grams (1.0 equivalent) of calcium metal are refluxed with 500 ml. of methanol for 2 hours to prepare a methanol solution of calcium methoxide. 460 grams (1.0 equivalent) of polyisobutene-substituted phenol in which the polyisobutene substituent contains an average of 22 carbon atoms and 300 grams of mineral oil are added and the whole is heated to 180° C. to remove methanol. The crude product is filtered for purposes of purification. The filtrate, a 61.5 percent oil solution of the desired oil-soluble calcium phenate, is found to contain 6.84 percent sulfate ash.

Example 16

332 grams (1.0 equivalent) of di-(tertiary-octylphenol) monosulfide, 41 grams (1.1 equivalents) of calcium hydroxide, 206 grams of 2-ethoxy-ethanol-1, and 100 grams of water are introduced into a reaction vessel and stirred for 1 hour at 100–105° Thereafter, the whole is heated to 140° C., 266 parts of mineral oil are added, and volatile material is removed at 160° C./15 mm. Hg. The residue in the flask is filtered for purposes of purification. The filtrate, a 57 percent oil solution of the desired calcium phenate of di-(tertiary-octylphenol) monosulfide, shows the following analyses:

Percent sulfate ash _____ 9.98
Percent sulfur _____ 2.89

Example 17

56 grams (2.0 equivalents) of calcium oxide are added to 400 grams of ethylene glycol at room temperature. An exothermic reaction causes the temperature to rise to 70° C. The whole is then heated to 120° C. and an additional 100 grams of ethylene glycol are added. Thereafter, 940 grams (2.0 equivalents) of a 50% oil solution of a condensation product of tertiary-octylphenol and formaldehyde (prepared by condensing 1 equivalent of paraformaldehyde with 2.5 equivalents of tertiary-octylphenol in oil solution for 2 hours at 100–110° C. in the presence of 3% by weight of 58 percent aqueous ammonium hydroxide) are added, together with 240 grams of mineral oil, and the whole is stirred for 1 hour at 100–105° C. Ethylene glycol and any water of reaction are removed by heating the reaction mixture to a temperature of 160° C. at 10 mm. Hg. The residue is filtered for purposes of purification. The filtrate, a 42 percent oil solution of the desired calcium phenate of teritiary-octylphenol-formaldehyde condensation product, is found to contain 10.1 percent sulfate ash.

COMPONENT C

This component, the alcohol, may be any one or more of the various available substituted or unsubstituted aliphatic alcohols containing from 1 to about 20 or more carbon atoms, in which alcohols the aliphatic group has an open chain or cyclic structure. In most cases, the alcohol will conform to the formula ROH, wherein R is an open chain aliphatic hydrocarbon radical containing from 1 to 20 carbon atoms. However, in some instances, the alcohol will contain organic and/or inorganic substituents such as aromatic radicals, homocyclic radicals, heterocyclic radicals, and nitro, ether, ester, sulfide, keto, amino, nitroso, etc., groups.

Examples of alcohols useful as this component include methanol, ethanol, n-propanol, isopropanol, n-butanol, isobutanol, n-pentanol-1, n-pentanol-2, isoamyl alcohol, n-hexanol-1, n-hexanol-2, 4-methyl-pentanol-2, n-heptanol, primary-isooctanol (prepared, for example, by the well-known Oxo process), 2-ethylhexanol, n-octanol, 3,5,5-trimethylhexanol, cyclohexanol, methylcyclohexanol, ethylcyclohexanol, benzyl alcohol, beta-phenethyl alcohol, 2-alpha-pyridyl-ethanol-1, tetrahydrofurfuryl alcohol, 2-cyclohexyl-ethanol-1, n-decanol, n-undecanol, lauryl alcohol, isododecanol (prepared, for example, by the hydration of triisobutylene), myristyl alcohol, oleyl alcohol, n-eicosanol, n-tricosanol, n-triacontanol, 2-phenoxy-ethanol-1, 2-phenoxyethoxy-ethanol-1, 6-chloro-n-hexanol-1, 8-nitro-n-octanol-1, 4-amino-cyclohexanol, ethylene glycol monooleate, glyceryl dipalmitate, 2-n-butoxy-ethanol-1, diethylene glycol monoethyl ether, 2-thiobutoxy-ethanol-1, etc. Of the various available alcohols, a preference is expressed for alkanols containing from 1 to about 12 carbon atoms such as methanol, isobutanol, n-hexanol, mixed primary amyl alcohols, primary isooctanol, 2-ethylhexanol, and lauryl alcohol. In lieu of a single alkanol, mixtures of two or more of such alkanols are particularly preferred. Thus, for example, mixtures of methyl, isobutyl, and primary amyl alcohols are especially effective and desirable as this component.

COMPONENT D

Component D, the calcium base, is usually a basically-reacting inorganic calcium compound such as calcium oxide, calcium hydroxide, calcium sulfide, calcium hydrosulfide, calcium amide, calcium carbide, calcium hydride, calcium peroxide, calcium nitride, and the like. It is also desirable, in some instances, to use a calcium alcoholate such as calcium methoxide, calcium ethoxide, etc., or a calcium alkyl carbonate such as calcium methyl carbonate. It is to be understood that mixtures of two or more of any of the above calcium bases may be employed as component D. Generally, however, this component will be either calcium oxide or calcium hydroxide.

In the ordinary practice of the invention, the carbonated calcium sulfonate complex of metal ratio 1.1–8, calcium phenate, alcohol, and a portion of the selected calcium base, and optionally, a low viscosity mineral oil are introduced into a reaction vessel and stirred at 30–100° C. Generally, the sulfonate complex is a solution of 20–75 percent by weight of such complex in a low viscosity mineral oil or volatile petroleum hydrocarbon solvent. The ratio of equivalents of sulfonate complex to calcium phenate is within the range from about 20:1 to about 2:1, more often from about 10:1 to 4:1. For the purpose of this specification, one equivalent of a sulfonate complex is that amount which contains one equivalent of sulfonic acid anion. The amount of alcohol or alcohol mixture used should be at least 5 percent and preferably 5 to 100 percent by weight of the sulfonate complex starting materials. After the whole is thoroughly mixed, carbon dioxide is introduced for 0.5–15 hours at 30–100°

C. Thereafter, the remainder of the calcium base is added portionwise, each addition thereof being followed by the introduction of further carbon dioxide. The final carbonation operation is carried out until titration of a sample of the reaction mass shows that the base number thereof is less than about 20, preferably 0–10. The alcohol and any water present are then removed by heating the mass at atmospheric or subatmospheric pressure until distillation has substantially ceased. The final, substantially neutral, carbonated calcium sulfonate complex having a metal ratio of at least about 10 is generally purified by filtration or centrifugation, although for some purposes it is possible to use the crude complex. This particular order of process steps, although most convenient, need not be followed. It is only necessary that the mixture of components A–D, inclusive, be carbonated until the base number thereof is less than about 20. The portionwise addition of the calcium base and carbon dioxide does facilitate, however, the formation of the complex in that it prevents the development of a highly viscous reaction mass which is difficult to stir and process.

The following examples are presented to illustrate specific modes of carrying out the process of this invention. They are intended for purposes of illustration only and are not be construed as limiting the scope of the invention, except as the appended claims require. Unless otherwise specified, all parts and percentages are by weight.

Example 18

1595 parts of the carbonated calcium sulfonate complex of Example 1 (1.54 equivalents based on sulfonic acid anion), 167 parts of the calcium phenate of Example 12 (0.19 equivalent), 616 parts of mineral oil, 157 parts of 91 percent assay calcium hydroxide (3.86 equivalents), 288 parts of methanol, 88 parts of isobutanol, and 56 parts of mixed isomeric primary-amyl alcohols (containing about 65% n-amyl, 3% isoamyl, and 32% of 2-methyl-1-butyl alcohols) are stirred vigorously at 40° C. and 25 parts of carbon dioxide is introduced over a period of 2 hours at 40–50° C. Thereafter, 3 additional portions of calcium hydroxide, each amounting to 157 parts, are added and each such addition is followed by the introduction of carbon dioxide as previously illustrated. After the fourth calcium hydroxide addition and carbonation step is completed, the reaction mass is carbonated for an additional hour at 43–47° C. to reduce the neutralization number of the whole to 4.0 (basic). The substantially neutral, carbonated reaction mixture is then freed from alcohol and any water of reaction by heating it to 150° C. and simultaneously blowing it with nitrogen. The residue in the reaction vessel is filtered for purposes of purification. The filtrate, an oil solution of the desired substantially neutral, carbonated calcium sulfonate complex of high metal ratio, shows the following analyses:

Percent sulfate ash _____ 41.11
Neutralization No. (basic) _____ 0.9
Metal ratio _____ 12.55

Example 19

An experiment is carried out in the same manner set forth in Example 18 above, except that the use of the calcium phenate component is omitted. When the final carbonation step is carried out, it is observed that when the basic number of the reaction mass falls below 20, the whole turns to a gray, grainy mass from which no oil-soluble carbonated calcium sulfonate complex can be isolated employing the same filtration of Example 18.

Example 20

A product is prepared in the same manner set forth in Example 18, except that 167 parts of the calcium phenate of Example 13 is used as component B.

Example 21

A product is made in the same manner set forth in Example 18, except that 1595 parts of the carbonated calcium sulfonate complex of Example 2 are employed as component A.

In comparing the process of this invention (Example 18) with a similar process which does not employ a calcium phenate (Example 19), it will be noted that, in the absence of the calcium phenate component, it is not conveniently possible through ordinary filtration to isolate an oil-soluble, substantially neutral calcium sulfonate complex having a metal ratio of at least about 10. Although it is possible to prepare such a complex by reacting a lower metal ratio calcium sulfonate with a calcium base in the presence of an alcohol promoter, difficulties are often encountered in processing sulfonate complexes made by this method. In particular, filtration of the product is often slow and laborious, requiring large amounts of filter aid material. Furthermore, the product often contains a relatively high percentage of solids which may not be desirable for some applications.

The following examples are presented to illustrate specific modes of preparing gels from the substantially neutral, carbonated calcium sulfonate complexes of this invention.

Example 22

1000 grams of the product of Example 18, 80 grams of methanol, 40 grams of mixed primary amyl alcohols (containing about 65% of n-amyl, 3% of isoamyl, and 32% of 2-methyl-1-butyl alcohols), and 80 grams of water are introduced into a reaction vessel and heated to 70° C. and maintained at that temperature for 4.2 hours. It is observed that the sulfonate complex is converted to a gelatinous mass. The latter is stirred and heated to 150° C. over a period of 2 hours to remove substantially all the alcohol and water. The residue is a dark green, tacky gel suitable for the preparation of lubricating greases.

Example 23

An experiment is carried out in the same manner set forth in Example 22, except that 120 grams of water are used in lieu of the specified water and alcohols. The time required for gelation is 5 hours.

The substantially neutral, carbonated calcium sulfonate complexes produced in accordance with the present invention can be employed in lubricants intended for use in the crankcases, cylinders, transmissions, gears, chassis, torque converters, etc. of automotive equipment, industrial machinery, and marine diesel engines. Other suitable uses for the complexes are in asphalt emulsions, insecticidal compositions, stabilizing agents for plasticizers and plastics, paints, rust-inhibiting compositions, slushing oils, pesticides, foaming compositions, cutting oils, metal drawing compositions, flushing oils, textile treatment compositions, tanning compositions, metal cleaning compositions, emulsifying agents, antiseptic cleansing compositions, penetrating oils, hydraulic oils, gum solvent compositions, fat-splitting compositions, bonding agents for ceramics and asbestos, asphalt improving agents, flotation agents, improving agents for hydrocarbon fuels such as gasoline, fuel oil, gas oil, etc.

The gels produced from the substantially neutral, carbonated calcium sulfonate complexes of this invention are principally useful, as indicated earlier, for the manufacture of high film strength lubricating greases. Such greases are prepared by blending from about 20 to about 90 parts of the gelled complex with from about 80 to about 10 parts by weight of an oil, preferably a mineral oil, although naturally-occurring vegetable or animal oils as well as synthetic oils such as dioctyl adipate, dinonyl sebacate, polymerized isobutenes, etc., may be used. The oil employed should have a Saybolt viscosity in the range from about 100 seconds at 100° F. to about 250 seconds at 210° F. and preferably from about 150 seconds at 100° F. to about 160 seconds at 210° F. (the latter value is equivalent to about 9600 seconds at 100° F.). The blending of the gel and the oil may be accomplished conveniently by known methods such as stirring them in a propeller type or egg beater type of mixer and/or milling them in a conventional grease milling machine.

The following examples are presented to illustrate the preparation of lubricating greases of this invention.

Example 24

650 parts of the gel of Example 22 and 350 parts of a solvent-refined neutral oil having a viscosity of 2000 seconds at 100° F. and a viscosity index of 90 are blended for 1 hour at room temperature in a Hobart model N–50 laboratory eccentric rotating beater available from the Hobart Manufacturing Company of Troy, Ohio. The resulting mixture is then milled in a laboratory grease milling machine (Tri-Homo dispenser-homogenizer, size 2½, high torque type, manufactured by the Tri-Homo Corporation of Salem, Mass.), for an additional hour at room temperature. The resulting lubricating grease has a penetration value of 270 as measured by ASTM procedure D217–52T.

Example 25

A lubricating grease is prepared in the same manner set forth in Example 24, except that 500 parts each of the specified oil and the gel of Example 23 are employed.

The film strength characteristics of a lubricating grease of the present invention were investigated by means of the Ford Film Life test. The apparatus used for this test is the Timken Extreme Pressure Lubricant testing machine manufactured by the Timken Roller Bearing Company of Canton, Ohio. The procedure for the test is as follows: 0.5 gram of grease is spread by hand over the surface area of the bearing surfaces (cup and block) of the machine and the thus-lubricated parts are installed. The machine is operated for 30 seconds at 800 r.p.m. with no load, then 10 pounds lever arm load is applied by means of the automatic loader and the machine is run for 8 hours unless scoring occurs earlier. Scoring constitutes welded or seized areas on the bearing surfaces and is detected by smoke and/or vibration coming from the machine. If the lubricant permits a score to occur, the lubricant is rated as having failed the test and the test time elapsed to failure is noted. If 8 hours' running time is completed without scoring and if the width of the wear track on the bearing surface does not exceed 1 mm., the lubricant is rated as having passed the test.

The test results given in the following table show that a grease of this invention possesses superior film strength.

Table.—Ford film life test

Grease employed: Test result
- Grease of this invention (Example 24) _____ Fail at 5 minutes.
- Control grease A[1] _____ Fail at 15 minutes.
- Control grease B (calcium carboxylic base) _____ Fail at 15 minutes.
- Control grease C (lithium carboxylate base) _____ Fail at 30 minutes.
- Control grease D (lithium-lead carboxylate base) ___ Pass (wear track width 0.6 mm.)

[1] Prepared in the same manner set forth in Example 24 except that in lieu of the gel of this invention there is used a gel prepared from a basic, carbonated calcium sulfonate complex (a complex like that of Example 19, except that carbonation is halted at a basic number of 25 to avoid decomposition).

The lubricating greases of this invention may also contain known improving agents such as, for example, barium, calcium, lead, zinc, and nickel diorganophosphorodithioates; phosphorus-sulfide-treated olefins; sulfurized and sulfur chloride-treated olefins; alkylphenate sulfides and disulfides; amines such as N-phenyl beta-naphthylamine, N-phenyl alpha-naphthylamine, paraaminophenol, N-alkylated phenylene diamines, and anthranilic acid and esters thereof; metal salts of phosphorus pentasulfide-treated polyethylenes, polypropylenes, polyisobutenes, etc.; hindered phenols such as 2,6-di-tertiary-butyl-4-methyl phenyl and 4,4'-methylene-bis-(2,6-di-tertiary-butylphenol); organoboron compounds such as borate esters and boric acid-treated amines, amides, and imides; phosphites and phosphates such as di-(4-methyl-2-phentyl) phosphite, dioleyl phosphite, tricresyl phosphate, tri-(ortho-chlorophenyl) phosphate, tri-(chlorobenzyl) phosphorothionate, etc.; extreme pressure agents such as substituted and unsubstituted hydrocarbon sulfides and polysulfides, halogenated aliphatic and cycloaliphatic compounds such as chlorinated paraffin waxes containing 20–75 percent of chlorine, chlorinated eicosane containing 40–80 percent of chlorine, chlorinated cyclohexane containing 20–70 percent of chlorine, and sulfurized esters such as sulfurized methyl oleate, sulfurized glyceryl trioleate, sulfurized sperm oil, etc.; dithiocarbamic esters and salts such as zinc diamyldithiocarbamate, lead dioctyldithiocarbamate, etc.; xanthic esters and salts; and other known improving agents.

What is claimed is:

1. A method of forming a gel adapted for the preparation of high film strength lubricating greases, which method comprises:
    (I) Preparing a substantially neutral, carbonated calcium sulfonate complex having a metal ratio of at least about 10 by the process which comprises preparing and mixing at a temperature within the range of from about 30° to about 100° C., a mass in which, at 50° C., at least 50 percent of the components are in the liquid state, and in which mass the active components consist of:
        (A) a carbonated calcium sulfonate complex having a metal ratio of from about 1.1 to about 8.0;
        (B) an oil-soluble calcium phenate; the ratio of equivalents of A:B being in the range from about 20:1 to about 2:1;
        (C) an aliphatic monohydric alcohol, in an amount of at least about 5 percent by weight of A;
        (D) a calcium base, in an amount such that there is present in the mass a total of at least about 10 equivalents of calcium per equivalent of A; and then treating the mass with carbon dioxide until the base number thereof is less than about 20 and heating it to drive off substantially all of the alcohol and any water present; and
    (II) Heating a mixture of the complex of I and from about 2 to about 40 percent by weight of water at a temperature of at least about 40° C. until said complex has gelled.

2. A method in accordance with claim 1 wherein component A of I is a carbonated calcium petroleum sulfonate complex.

3. A method in accordance with claim 1 wherein componet A of I is a carbonated calcium mahogany sulfonate complex.

4. A method in accordance with claim 1 wherein component A of I is a carbonated calcium alkaryl sulfonate complex.

5. A method in accordance with claim 1 wherein component A of I is a carbonated calcium tridecyl benzene bottoms sulfonate complex.

6. A method in accordance with claim 1 wherein component B of I is a calcium phenate of an alkylphenol-aldehyde condensation product.

7. A method in accordance with claim 1 wherein component B of I is a calcium phenate of a heptylphenol-formaldehyde condensation product.

8. A method in accordance with claim 1 wherein component C of I is an alkanol containing from 1 to about 12 carbon atoms.

9. A method in accordance with claim 1 wherein component C of I is a mixture of methyl, isobutyl, and primary amyl alcohols.

10. A method in accordance with claim 1 wherein component D of I is calcium hydroxide.

11. A method in accordance with claim 1 wherein an alkanol containing from 1 to about 12 carbon atoms is additionally present in the mixture of II.

12. A method in accordance with claim 1 wherein a mixture of methyl and primary amyl alcohols is additionally present in the mixture of II.

13. A high film strength lubricating grease comprising from about 20 to about 90 parts of a gel prepared in accordance with the method of claim 1 and from about 80 to about 10 parts of an oil having a Saybolt viscosity within the range from about 100 seconds at 100° F. to about 250 seconds at 210° F.

14. A grease in accordance with claim 13 wherein the oil is a mineral oil.

References Cited

UNITED STATES PATENTS 3,172,855  3/1965  Rogers et al. -------- 252—32.7

DANIEL E. WYMAN, *Primary Examiner.*

I. VAUGHN, *Assistant Examiner.*